(No Model.)
A. ROSEWATER.
AUTOMATIC FLUSH TANK.
No. 330,352. Patented Nov. 10, 1885.
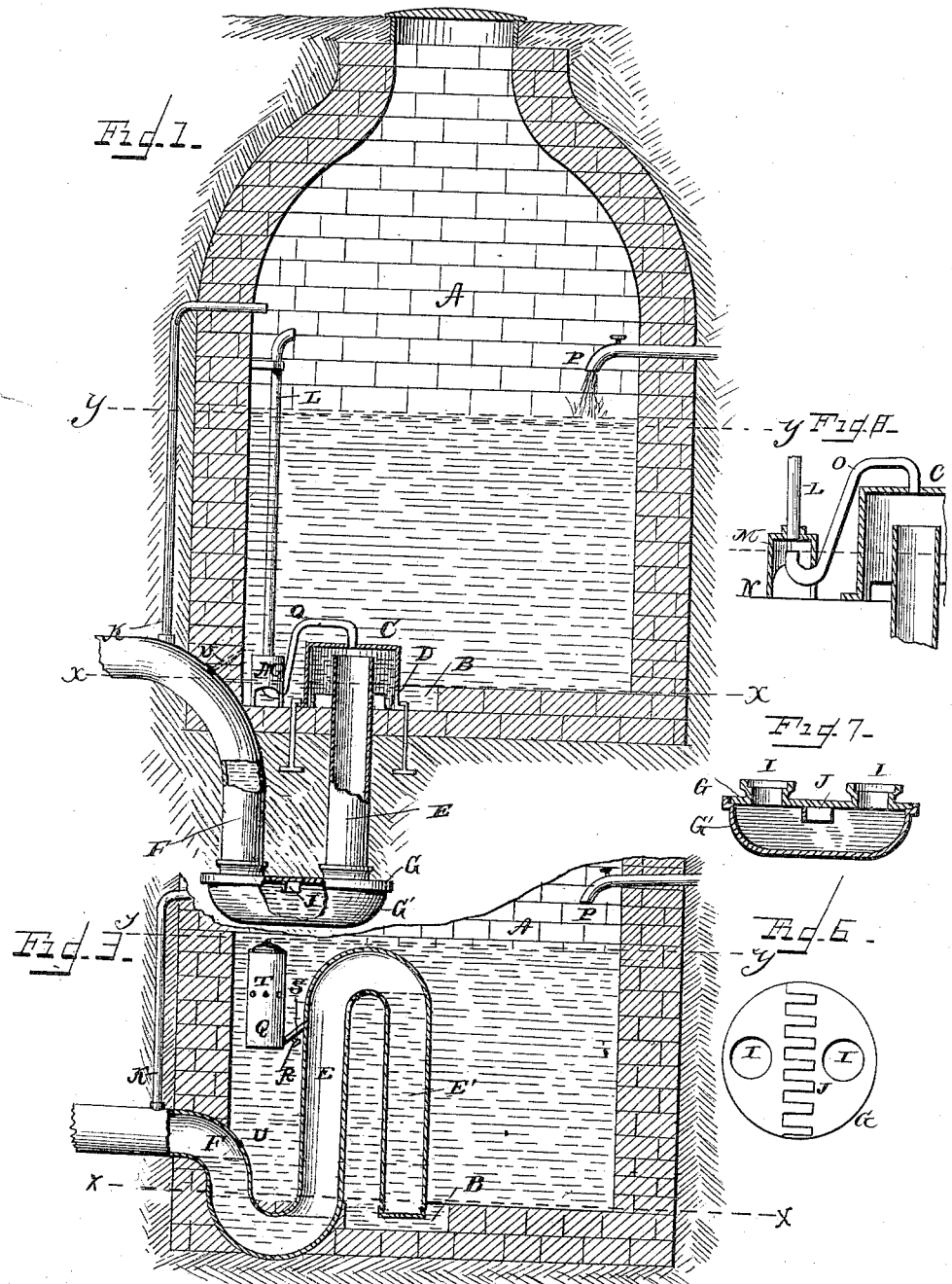
WITNESSES
INVENTOR
Andrew Rosewater,
By Louis Bagger & Co.
Attorney

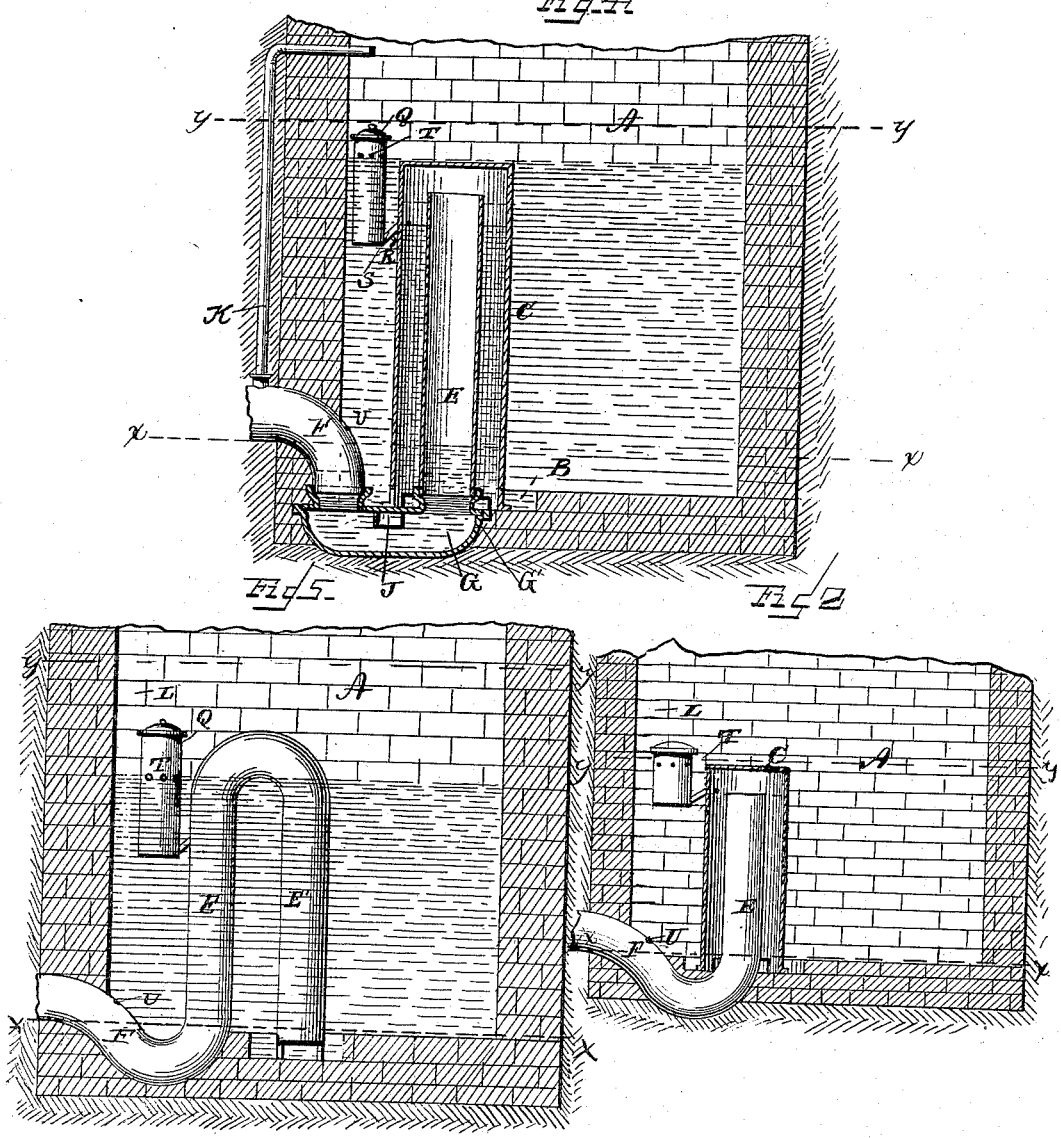

UNITED STATES PATENT OFFICE.

ANDREW ROSEWATER, OF OMAHA, NEBRASKA.

AUTOMATIC FLUSH-TANK.

SPECIFICATION forming part of Letters Patent No. 330,352, dated November 10, 1885

Application filed April 16, 1885. Serial No. 162,408. (No model.)

*To all whom it may concern:*

Be it known that I, ANDREW ROSEWATER, a citizen of the United States, and a resident of Omaha, in the county of Douglas and State of Nebraska, have invented certain new and useful Improvements in Automatic Devices for Flushing Tanks, &c.; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of a tank supplied with one of my automatic flushing devices. Figs. 2, 3, 4, and 5 are modifications of the same. Fig. 6 is a bottom view of the top of the trap. Fig. 7 is a transverse sectional view of the same, and Fig. 8 is a transverse vertical sectional view of the inlet-air chamber.

My invention relates to automatic devices for flushing tanks, sewers, &c., and has for its object to produce such a device as will be reliable, efficient, and durable; and it consists in the combination and arrangement of parts, as will be more particularly described, and pointed out in the claims.

In the accompanying drawings, A represents the tank, the bottom of which has the recess B, in which an inverted vessel, C, is secured on its feet D, forming an air-chamber. Extending downward from the interior of this air-chamber, through the bottom of the tank, is the pipe E, having a trap at its bottom, and connecting by means of the trap with the shorter arm F of a siphon, the longer arm of which is not shown in the drawings, and which leads to the sewer or wasteway.

The trap above referred to is formed of the basin G' and the top G. This top fits in the groove around the top of the basin, and is made water-tight by any of the well-known methods for doing such work. It has two openings, I I, in which the pipes E and F are secured. On the under side of this top G, and between the openings I I, is a downwardly-extending projection, J, forming the seal. I prefer to make this seal corrugated, as shown; but it can be made straight across or curved around the bottom of the pipe E, as desired.

At the upper bend of the siphon-arm F is a pipe, K, which extends upwardly and through the side of the tank into its interior above the high-water line. This pipe K can be dispensed with, if desired, and a small opening, U, made in the pipe just above the low-water line $xx$, connecting with the water on the inside of the tank.

Upon the inside of the tank is another pipe, L, the top of which is above the high-water line, and the bottom of which opens into the inverted vessel M, standing upon its feet N, similar to the air-chamber C. These feet N are so short that the mouth of the vessel M is always below the low-water line. Leading from the interior of this vessel M into the top of the air-chamber C is a pipe, O, the lower end of which is lower than the top of the air-chamber C, and turned upward in the vessel M, as shown in Fig. 8. The tank A is filled by means of the pipe P.

The operation of the device is as follows: After the tank is built, and before it is to be filled with the water from the pipe P, the pipes E and F are filled with water up to the outflow-line $xx$. The tank A is then filled with clean water until it is level with the lower end of the pipe O within the vessel M. By thus filling the pipes and bottom of the tank with clean water no grease or floating refuse is ever allowed to enter the pipes, as the water in the tank A never falls to the bottom of the vessel M. The tank is then gradually filled through the pipe P. As the water rises in the tank, the air in the chamber C is gradually forced down the pipe E, displacing the water in the lower part thereof through G' and F until it reaches the seal J; and the parts are so proportioned in size to each other and to the high-water pressure in the tank that when this takes place the water in C is very nearly high enough to flow into E. When, therefore, the air in E, which is under some compression, begins to pass the seal, it passes swiftly, both from its compression and from the water-pressure in C behind it, and as its movement permits an instantaneous movement of the water above there is the momentum of the moving column of water as well as the head-pressure in the tank to keep up the passage of the air past the seal till it has entirely passed.

By having the seal corrugated, as described, a larger volume of air is confined by it, and when the weight of the water in the tank finally forces any of it past the seal a larger quantity goes at once than would have done if the seal were not there or were of a shorter length than is secured by means of the corrugation.

The siphon having once commenced to operate, it will continue until the water-level in the tank A reaches the line x x, when air will be admitted through the pipe O into the air-chamber C, which will prevent any more water being taken from the tank. Air will also enter the siphon through the pipe K, and stop its operation before the water has been drawn out of the trap at the bottom of the pipe E.

Owing, however, to the velocity of the water in passing through the pipes E and F, part of the water in E will pass out before the siphonage will stop entirely, so that when it comes to rest the water-level in the two pipes will be some little distance below the low-water line x x. This, in connection with the large size of the chamber C, will cause the device to operate as described.

If the pipe K is dispensed with, and the opening U substituted in its place, the tank will in like manner be completely drained, or nearly so. As the tank is filling through the pipe P, enough water will escape through the opening U to fill the trap again ready for operation. This operation will be repeated as often as the tank is filled and emptied.

Instead of having the pipe E extend down from the bottom of the tank, as above described, it can be made to project upward into the tank, and the vessel C be increased in length accordingly; or the pipe E can be made in the form of a siphon having a shorter arm, E', leading down below the low-water line. In these styles of my devices, and which are only modifications of the invention described above, the pipes O and L and the vessel M are dispensed with, and the air-chamber Q, provided with openings T, and the inclined pipe S, provided with the cock R, are used in their place. The trap and seal described above can be used or dispensed with, as desired.

The operation of these modifications is as follows: As the water rises in the tank A the air in the pipe E is forced through the pipe S into the vessel Q and escapes through the openings T. As soon as the water in the tank rises to and above these openings no more air can escape, and that remaining in the pipe is compressed until the water rises above the openings T to a height sufficient for its weight to overcome the weight of the water in the shorter arm F of the siphon, and the same process is repeated, as is described in the first case. When the water in the tank has fallen to the level of the openings T, the water in the bottom of the vessel Q, which entered it at the openings T as the tank was filling, will commence escaping into the pipe E through the pipe S, and will so continue to escape until the vessel Q is emptied, when air will enter the pipe E or the air-chamber C and stop the flow of the water out of the tank. As the bottom of the pipe E' is below the low-water line, all grease and refuse that is floating on top of the water is prevented from entering the pipes, as in the first instance.

The pipes E and F are emptied by the siphon and afterward filled by water through the opening U, which is located in the pipe F and communicates with the interior of the tank. The emptying of the vessel Q is regulated by means of the cock R in the pipe S. If the vessel Q is emptied before the low-water line is reached, air will enter the pipe E or the air-chamber C and stop operation before the tank A has been emptied, and if it is not emptied by the time the water reaches the bottom of the pipe E' all the water in the tank, including grease and floating refuse, will be drawn out through the siphon. The vessel Q can be made of any desired size, and the openings placed even with or below the top of the pipe E, as desired, and the arm F can be of any desired length, care only being taken that the length of the arm does not exceed the vertical distance between the openings T in the vessel Q and the entrance-pipe P. It should be somewhat shorter than that to make sure that the tank will operate successfully.

It will be seen from the above description that my improvement can be cheaply constructed, and that it will always operate, as no foreign matter can possibly enter the pipes to clog them. It can be placed below frost-line, and will never freeze.

Having thus described my invention, what I claim, and desire to secure by Letters Patent of the United States, is—

1. In a flushing device for sewers, kitchen-sinks, &c., the combination, with a receiving-tank provided with an inlet-pipe, of an air-compressing chamber secured within said tank, and suitable means for admitting air into said air-compressing chamber at any desired water-level, a pipe leading from within said air-chamber downward and connecting with the shorter arm of a siphon, said shorter arm being provided with an opening into the receiving-tank, and the longer arm of said siphon leading to a sewer or wasteway, substantially as and for the purpose set forth.

2. In a flushing device for sewers, sinks, &c., the combination, with a receiving-tank provided with an inflow-pipe, of an air-compressing chamber secured within said tank, a pipe within said tank the top of which is above the water in the tank at its highest level and extending nearly to the bottom of the tank and terminating in an inverted-cup-shaped vessel, a pipe the lower end of which is below the top of the air-compressing chamber and turned upward and extends into this cup-shaped vessel, and the other end leads into the upper part of the air-compressing chamber, a pipe extending downward from within the air-compressing chamber, and is connected to the shorter arm of a siphon, the longer arm of which leads to a sewer or wasteway, said shorter arm being provided with an opening into the interior of the tank higher than low-water level, and the longer arm leads to a sewer or wasteway, substantially as and for the purpose set forth.

3. In a flushing device for sewers, sinks, &c., the combination, with the lower end of the escape-pipe and the lower end of the shorter arm of a siphon, of a trap, the under side of the top of which is wider than said pipes and provided with a downwardly-projecting seal, the lower edge of which is level, said seal extending entirely across the trap between the openings for said pipes, substantially as and for the purpose set forth.

4. In a flushing device for sewers, sinks, &c., the combination, with the lower end of the escape-pipe and the lower end of the shorter arm of a siphon, of a trap the under side of the top of which is provided with a downwardly-projecting corrugated seal the lower edge of which is level and extends aross the top between the openings for said escape-pipe and end of the siphon-arm, substantially as and for the purpose set forth.

5. In a flushing device for sewers, sinks, &c., the combination, with a tank provided with an inflow-pipe and the described air-compressing chamber, and suitable means for admitting air into the same at any desired water-level of the described trap G G' J, of a pipe connecting said air-compressing chamber and said trap, and a siphon connecting said trap with a sewer or wasteway, substantially as and for the purpose set forth.

In testimony that I claim the foregoing as my own I have hereunto affixed my signature in presence of two witnesses.

ANDREW ROSEWATER.

Witnesses:
   GEO. W. TILLSON,
   A. J. GROVER.